(12) United States Patent
Shearin (10) Patent No.: US 10,970,506 B2
(45) Date of Patent: Apr. 6, 2021

(54) BIOPTIC DATA READER WITH WIDE-ANGLE FIELD-OF-VIEW

(71) Applicant: DATALOGIC USA, INC., Eugene, OR (US)

(72) Inventor: Alan Shearin, Eugene, OR (US)

(73) Assignee: DATALOGIC USA, INC., Eugene, OR (US)

(*) Notice: Subject to any disclaimer, the term of this patent is extended or adjusted under 35 U.S.C. 154(b) by 0 days.

(21) Appl. No.: 16/231,214

(22) Filed: Dec. 21, 2018

(65) Prior Publication Data
US 2020/0202085 A1    Jun. 25, 2020

(51) Int. Cl.
*G06K 7/10* (2006.01)

(52) U.S. Cl.
CPC ....... *G06K 7/1096* (2013.01); *G06K 7/10831* (2013.01); *G06K 7/10841* (2013.01); *G06K 7/10861* (2013.01)

(58) Field of Classification Search
CPC ........ G06K 7/00; G06Q 20/20; G07G 1/0036; G07G 1/0045
USPC ........................................ 235/454, 383, 385
See application file for complete search history.

(56) References Cited

U.S. PATENT DOCUMENTS

| | | | |
|---|---|---|---|
| RE40,071 E | 2/2008 | Svetal et al. | |
| 8,033,472 B2* | 10/2011 | Giebel | G06K 7/0004 235/462.41 |
| 8,430,318 B2 | 4/2013 | McQueen et al. | |
| 8,453,933 B1* | 6/2013 | Pang | G06K 7/10554 235/462.25 |
| 8,662,397 B2 | 3/2014 | Carlson | |
| 8,678,286 B2 | 3/2014 | Smith et al. | |
| 8,678,287 B2 | 3/2014 | Olmstead | |
| 9,710,684 B2 | 7/2017 | Detwiler | |
| 2009/0078775 A1* | 3/2009 | Giebel | G06K 7/0004 235/462.41 |
| 2009/0206161 A1 | 8/2009 | Olmstead | |
| 2009/0307097 A1 | 12/2009 | De Faria | |
| 2010/0193588 A1 | 8/2010 | Cherry | |
| 2010/0282850 A1 | 11/2010 | Olmstead et al. | |
| 2011/0168780 A1 | 7/2011 | McQueen et al. | |
| 2012/0145791 A1 | 8/2012 | Gregerson | |
| 2012/0211565 A1 | 8/2012 | Colavito et al. | |
| 2013/0181051 A1 | 7/2013 | Olmstead et al. | |

(Continued)

OTHER PUBLICATIONS

"EA21 Decoded 2D Imager", Product profile, Intermec Technologies Corporation, Jun. 2010, 2 pages.

(Continued)

*Primary Examiner* — Daniel St Cyr
(74) *Attorney, Agent, or Firm* — Stoel Rives LLP (57) ABSTRACT

The disclosure relates to a data reading system including a platter having a generally horizontal surface and a bonnet extending perpendicularly from the platter. The platter and bonnet each include a scan window positioned thereon, through which an imager projects a field-of-view to capture encoded data from an item. The fields-of-view of the imagers are non-segmented and are not otherwise redirected by mirrors, prisms, or other optics components. The fields-of-view of the imagers may have sufficiently wide angles to ensure that the collective fields-of-view capture all side surfaces of the item as it passes across the read region of the data reading system.

20 Claims, 5 Drawing Sheets

(56) References Cited

U.S. PATENT DOCUMENTS

| | | | | |
|---|---|---|---|---|
| 2014/0061308 A1* | 3/2014 | Madej | ................ | G07G 1/0018 |
| | | | | 235/440 |
| 2016/0210492 A1 | 7/2016 | Trajkovic et al. | | |
| 2016/0292475 A1* | 10/2016 | Madej | ................ | G06F 16/907 |

OTHER PUBLICATIONS

"EX25 Near/Far 2D Imager Engine 3rd Generation", Product profile, Intermec Technologies Corporation, Dec. 2013, 2 pages.
"Magellan™ 9300i/9400i", Datalogic ADC, Inc., Mar. 17, 2015, 2 pages.
"Stratos 2400 Series—Bioptic Scanner/Scale", Honeywell International Inc., Jun. 2010, 2 pages.
"Stratos 2700 Series—Bioptic Scanner/Scale", Honeywell International Inc., Dec. 2012, 2 pages.

* cited by examiner

BIOPTIC DATA READER WITH WIDE-ANGLE FIELD-OF-VIEW

BACKGROUND

The field of this disclosure relates generally to systems and methods for data reading and/or image capture, and more particularly, to such systems incorporating imagers having wide fields-of-view to facilitate data reading processes.

Data reading systems are used in a variety of settings for reading optical codes, acquiring data, and/or capturing images. For instance, in retail stores, data reading devices are well known for reading UPC and other types of optical codes (e.g., barcodes) on grocery items or packages. One common data reader used in such systems is an imager-based reader that employs an imaging device or sensor array, such as a CCD (charge coupled device) or CMOS (complementary metal oxide semiconductor) device. An imager-based reader uses an imager or camera to generate electronic image data, typically in digital form, of an optical code. The image data is then processed to decode the optical code (e.g., barcode). Imager-based readers can be configured to read a variety of data, such as 1-D and 2-D optical codes, as well as other types of optical codes or barcode symbologies.

Some data reading devices, such as bioptic readers, include one or more imagers arranged to capture item views through a horizontal scanning window and/or a vertical scanning window. To accommodate the imagers and provide the proper viewing angles through the scanning windows, such data readers typically employ a variety of mirrors (e.g., static mirrors, rotating mirrors) or other suitable optics arranged as needed to segment and/or redirect the imager views through the scanning windows. In addition to the complex arrangement of mirrors or other optics, such bioptic readers typically require a relatively large housing with sufficient interior space to accommodate relatively long optical pathways to arrange the desired fields-of-view.

Accordingly, the present inventor has recognized a need for an improved bioptic reader design operable to capture image views of items passing through a read region of the reader without using mirrors or similar optics devices for segmenting or redirecting the imager fields-of-view. In addition, the present inventor has recognized a need for such a reader with a compact, streamlined design using minimal imagers to collectively capture all sides of an object passing through the data reader. Additional aspects and advantages will be apparent from the following detailed description of preferred embodiments, which proceeds with reference to the accompanying drawings.

DETAILED DESCRIPTION OF EMBODIMENTS

With reference to the drawings, this section describes particular embodiments and their detailed construction and operation. The embodiments described herein are set forth by way of illustration only and not limitation. The described features, structures, characteristics, and methods of operation may be combined in any suitable manner in one or more embodiments. In view of the disclosure herein, those skilled in the art will recognize that the various embodiments can be practiced without one or more of the specific details or with other methods, components, materials, or the like. In other instances, well-known structures, materials, or methods of operation are not shown or not described in detail to avoid obscuring more pertinent aspects of the embodiments.

Various imager-based data readers and associated methods are described herein. Some embodiments of such systems may improve or enhance the reading performance of the data readers by providing image fields or fields-of-view to capture multiple views of a target region. In contrast to many conventional data reader arrangements, the disclosed data reader uses a pair of imagers, each having wide-angle fields-of-view to obtain a collective six-sided view of an item passing through the read region of the data reader, where the data readers capture the item views without reliance on any mirrors or other optics to segment and/or redirect the image views. In other words, the data reader is designed to capture views of all sides of an object passing through the read region of the data reader without segmenting or redirecting any of the fields-of-view using mirrors or other optics arrangements. Preferably, the data reading system uses only two imagers, one arranged underneath a horizontal surface of the data reader and one arranged behind a vertical portion of the data reader as further described in detail below. This arrangement provides for a robust data reader design that minimizes components to accommodate a more streamlined data reading system with a compact footprint. Additional details of these and other embodiments are further discussed below with reference to the accompanying figures.

FIGS. 1-5 collectively illustrate various features of a data reading system 100 operable to obtain information (e.g., optical codes, images, etc.) from an example six-sided item 20 (e.g., a grocery item) that is passed through a view volume of the data reading system 100. For general purposes of discussion, the item 20 is represented in the figures as a six-sided, box-shaped package having a top surface 26, a bottom surface 28, a leading side 30, a trailing side 32, a customer side 34, and a bonnet side 36. In some instances, the item 20 may be described with respect to its direction of motion 22 as moved across the data reading system 100 by a customer 38 (or clerk or other personnel). While the item 20 is illustrated and described as a box-shaped package for convenience, it should be understood that the item 20 may encompass other shapes, including, for example, round fruits or vegetables, cylindrical cans, irregularly shaped packages, such as a bag of potatoes, potato chips, or the like.

The figures and description reference an example use of the data reading system 100 in a self-checkout context where the data reading system 100 is used by a customer 38. It should be understood that use in a self-checkout configuration is intended to provide an example environment of use and is not otherwise intended to be limiting. In other embodiments, the customer 38 may be replaced by a clerk or other personnel, as noted previously, such as during a conventional data reading process where the customer stands on the opposite side of the data reader (e.g., behind the bonnet 114) and the clerk stands in front of the data reading system 100. Accordingly, reference to the customer side 34 of the item 20 and the position of the customer 38 are intended to establish an easy frame of reference and should not be understood as limiting the described subject matter to self-checkout embodiments.

Figure 1:
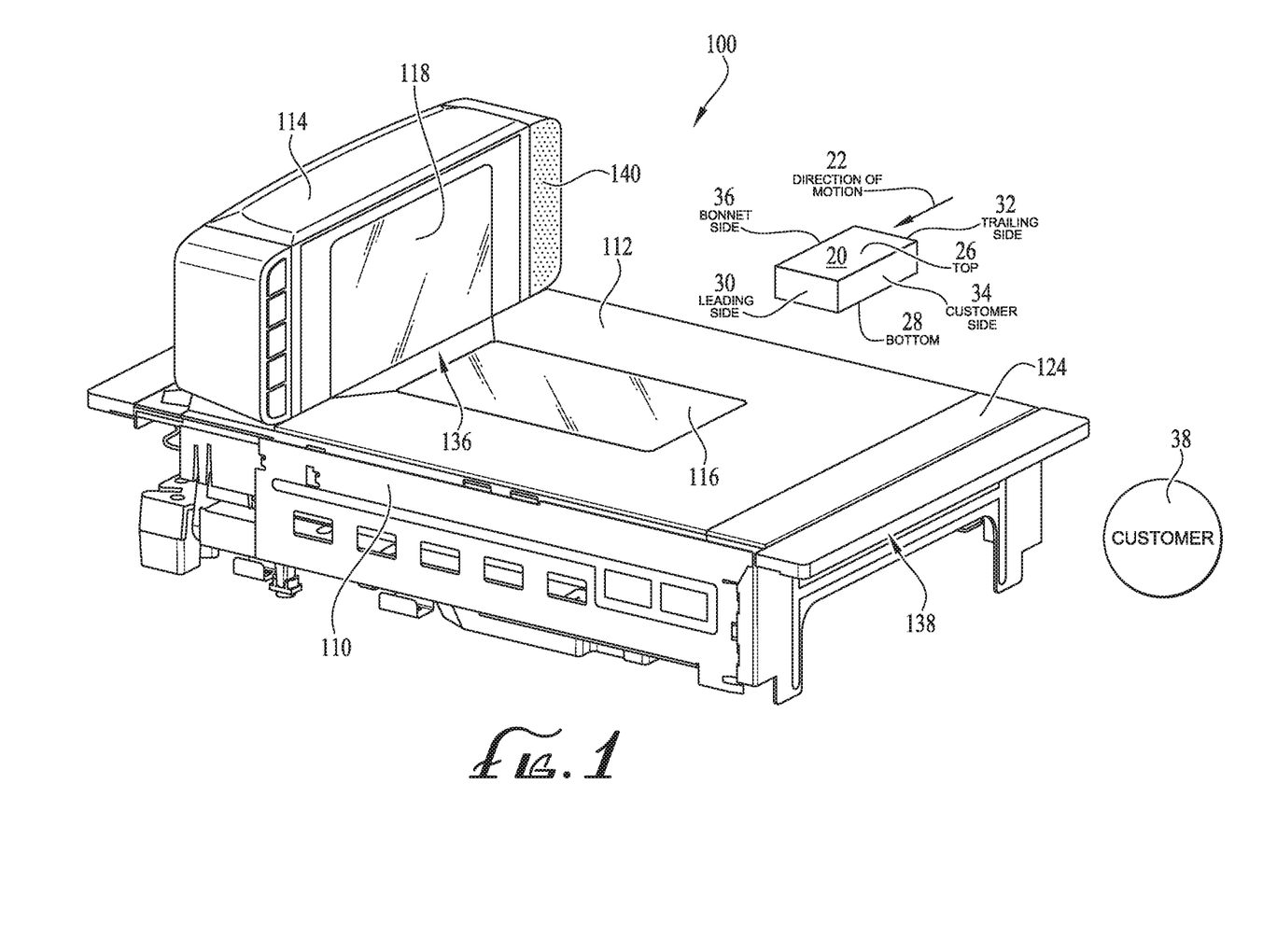
FIG. 1 is a perspective view of a data reader illustrating an example six-sided box-shaped object that may be passed through a read region of the data reader in a self-checkout configuration.

With general reference to FIG. 1, the following section briefly describes general components of the data reading system 100 and provides an example operation of the data reading system 100. As illustrated, the data reading system 100 may be a two-plane or bioptic reader having a lower base section 110 supporting a platter 112, and a bonnet or raised upper section 114 extending from and protruding upwardly from the platter 112 (and the lower base section 110). The data reading system 100 includes a platter imager 120 (see FIG. 2) housed within lower base section 110 underneath the platter 112, and a bonnet imager 122 housed within the bonnet 114, the imagers 120, 122 each projecting respective fields-of-view through the respective windows 116, 118 to attempt to capture and decode an optical code on the item 20.

In an example operation, the item 20 is moved across the platter 112 above the scan window 116 and in front of the scan window 118. If the optical code (or other target data) is present on the bonnet side surface 36 of the item 20, the bonnet imager 122 reading through the window 118 of the bonnet 114 captures an image of the side surface 36 for decoding the optical code. Similarly, if the optical code is on the bottom surface 28 of the item 20, then the platter imager 120 reading through the window 116 may capture an image for decoding the optical code. If the optical code is on any of the remaining surfaces of the item 20, one or both imagers 120, 122 (either individually or in combination) may capture image views bearing the optical code on the item 20. If the optical code is positively captured and decoded, the data reading system 100 may emit a beeping (or other) sound indicating that the optical code was properly read. Alternatively, the date reading system 100 may emit a different beeping (or other) sound indicating that the optical code was not properly read and may also emit a message requesting that the user reprocess the item 20.

The following describes further detailed aspects of this and other embodiments of the data reading system 100. It should be understood that certain embodiments of the data reading system 100 may be illustrated or described herein in the context of use in retail establishments or other similar environments. It should be understood that such use in a retail establishment is merely one example use for such a system and should not be considered as limiting. Other uses for data readers with the characteristics and features described herein may be possible, for example, use in an industrial location such as a parcel distribution (e.g., postal) station.

For clarity purposes, the following description may provide examples or ranges for dimensions of various components of the data reading system 100. It should be understood that the provided dimensions of the data reading system 100 may vary in accordance with a number of factors, such as the available space and configuration at an installation location (e.g., a grocery store counter). It should be understood that in embodiments where ranges are provided, other sizes and dimensions for the data reading system 100 or various other components may be used without departing from the principles of the disclosure.

Figure 2:
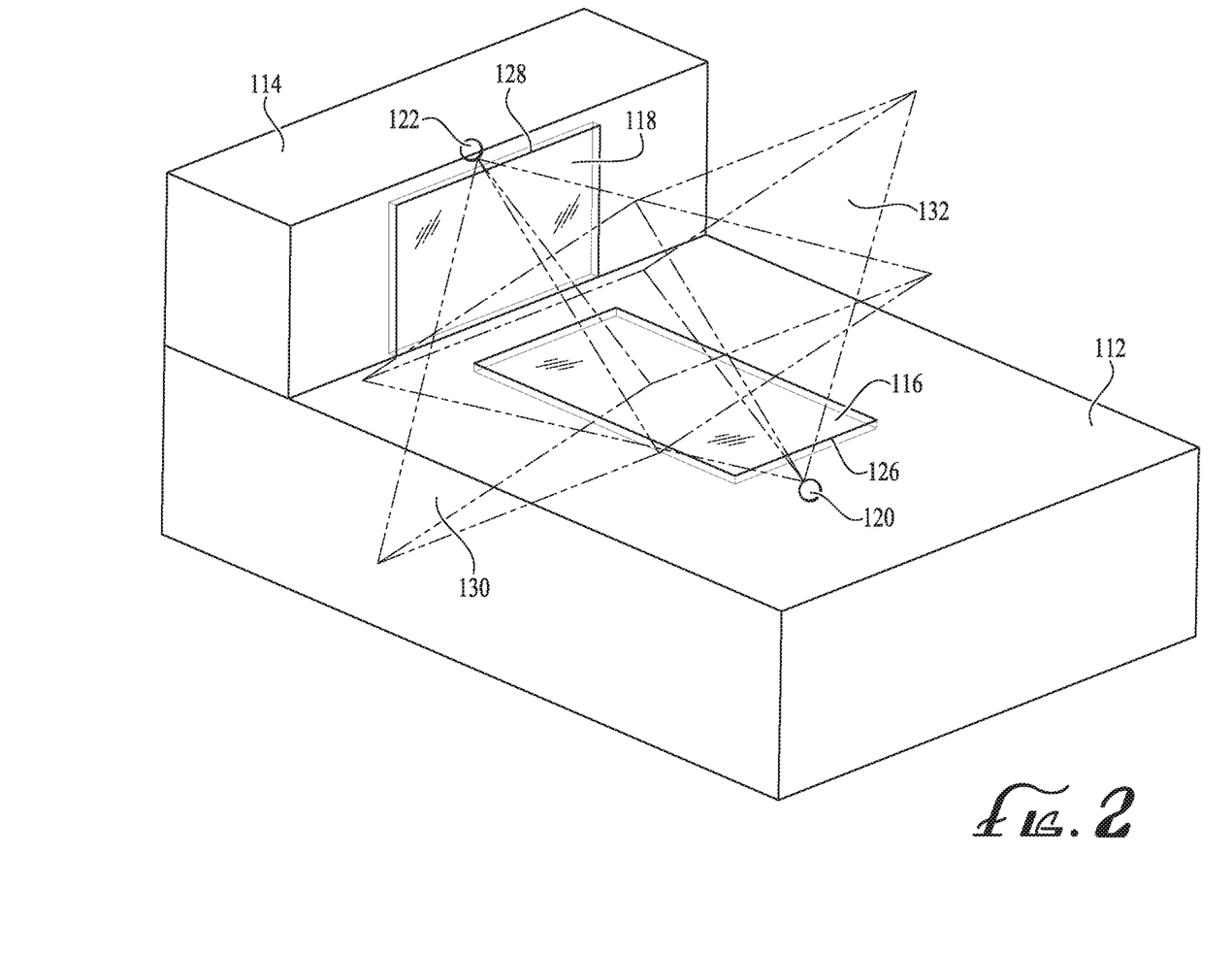
FIG. 2 is a diagrammatic view of the data reader of FIG. 1 showing fields-of-view of the imagers over the read region of the data reader.

FIGS. 1 and 2 collectively illustrate views of a data reading system 100 for capturing views and reading information from an item 20 passing through a read region of the data reader. With reference to FIGS. 1 and 2, the data reading system 100 includes a lower base section 110 and an upper cover/platter 112, which, in some embodiments, may be a separate component and removable from the lower base section 110. The platter 112 may include both a horizontal section and a vertical upper section which covers or forms a portion of the bonnet 114 shown in FIG. 1. In some embodiments, the platter 112 may thus be in a dual-plane configuration comprising a weigh platter operable for weighing an item 20, such as the All-Weighs® platter available from Datalogic ADC, Inc. of Eugene, Oreg. or as described in U.S. Pat. No. RE40,071, reissued Feb. 19, 2008, and entitled "Multiple Plane Weigh Platter for Multiple Plane Scanning Systems," the disclosure of which is hereby incorporated by reference in its entirety. When the platter 112 including both the horizontal and vertical sections is installed, the horizontal platter section may be considered as part of the lower base section 110, and the vertical upper section may be considered as part of the bonnet 114.

As illustrated in FIG. 1, the horizontal section of the platter 112 includes a horizontal scan window 116 disposed thereon and made of a sufficiently transparent material (e.g., glass, acrylic, and the like) through which the platter imager 120 (see FIG. 2) may read optical codes on the item 20 as previously described. Additional details and example embodiments of a data reading system with a bottom data reader operable to read the bottom surface of an item are described in U.S. Pat. No. 8,430,318, issued Apr. 30, 2013, and entitled "System and Method for Data Reading with Low Profile Arrangement," as well as in U.S. App. Pub No. 2013/0181051, published Jul. 18, 2013, and entitled "Two-Plane Optical Code Reader for Acquisition of Multiple Views of an Object," the disclosures of each of which are hereby incorporated by reference in their entireties.

Preferably, the window 116 is positioned in a central or mid-region of the platter 112 between a front end 136 and an opposite rear end 138 of the platter 112 (or in other embodiments may be placed in any other portion of the platter 112), so that the item 20 travels over the window 116 as the item 20 is moved in the direction of motion 22. To help protect the window 116 from damage or chipping and to provide for a smooth passage of items over the window 116, the window 116 is preferably mounted flush with the surface of the platter 112.

With reference to FIG. 1, the data reading system 100 includes a vertical section or bonnet 114 extending generally perpendicular to (e.g., forms a 90 degree angle) and upwardly adjacent the first end 136 of the platter 112. The bonnet 114 includes a front face 140 oriented toward the second end 138 of the platter. The front face 140 of the bonnet 114 includes a vertical scan window 118 disposed thereon and made of a sufficiently transparent material (e.g., glass, acrylic, and the like) through which one or more bonnet imagers 122 (see FIG. 2) may read optical codes on the item 20 in a similar fashion as previously described.

The bonnet 114 may extend to any desired height above the surface of the platter 112. For example, in some embodiments, the bonnet 114 may be relatively short and extend to a height of less than five inches above the horizontal surface of the platter 112. In other embodiments, the bonnet 114 may be taller, such as having a height of between five to ten inches or more. Preferably, the bonnet 114 has a height dimension that is sufficiently tall so as to maintain a streamlined profile for the data reading system 100, while also accommodating a sufficiently wide field-of-view for the bonnet imager 122 to capture views of the item 20 as further described in detail below with particular reference to FIGS. 3-5.

In some embodiments, the bonnet 114 may have a slightly curved contour such that the outer ends of the bonnet 114 help protect the window section 118 by providing a physical barrier to deflect the item 20 in cases when the item 20 is swept too closely to the window section 118 during a self-checkout process. For instance, during a typical checkout or item processing, the item 20 is moved from an initial position and swept across the platter 112 and over the scan window 114. In some instances, the item 20 may be swept in an arc motion across the platter 112 such that the item 20 may be close to the window section 118. The curvature of the bonnet 114 may provide sufficient clearance so that the item 20 (moving in an arc-like motion) avoids contacting/impacting the window section 118. In addition, in some instances, the curvature at the ends of the bonnet 114 provides a surface or shield upon which the item 20 may make contact instead of contacting, and potentially damaging, the window section 118.

In addition to helping protect the window section 118, the curved bonnet 114 also provides a larger usable surface area of the platter 112 to allow for more room for larger items 20. In embodiments where the platter 112 is a weigh platter, the curvature of the bonnet 114 may also help prevent a round item 20 from rolling off the platter 112 as it is being weighed. In other embodiments, the bonnet 114 may have a different profile, such as an angular, multi-faceted, or other suitable shape, which may accomplish the same or similar function as the curved bonnet 114 described herein.

In some embodiments, the platter 112 may include a bumper or raised section 124 for inhibiting items, such as spherical fruit and cylindrical cans, from rolling off the edge of the platter 112. The bumper 124 may also provide a bearing surface for long items 20 to rest against during a weighing operation. For instance, depending on the length of the platter 112, some items 20 that need to be weighed may be longer than the length of the platter 112 (e.g., leeks, celery stalks, carrots, etc.) such that one end of the item 20 is partially supported by the bonnet 114 during a weighing operation and the other end of the item 20 rests on the platter 112. In such instances, the bumper 124 provides a bearing surface against which the end of the item 20 may bear to help prevent the item 20 from sliding off the platter 112.

With collective reference to FIGS. 2-5, the following section provides additional details of an arrangement for the imagers 120, 122 of the data reading system 100. As further discussed in detail below, the data reading system 100 is designed to facilitate a retail checkout process for a self-service checkout station, although it should be understood that the data reading system 100 may be adapted for other uses different from a retail establishment as previously described.

FIG. 2 is a diagrammatic view of the data reading system 100 illustrating an arrangement for the imagers 120, 122 in accordance with one embodiment. In some embodiments, the imagers 120, 122 may be global shutter imagers utilizing pixels of 3 microns or less arranged at high densities of 2 megapixels or more. The imagers 120, 122 may have an aspect ratio arranged in a panoramic configuration with a width-to-height ratio greater than 120%. The smaller pixel size of the imagers 120, 122 allow shorter focal lengths to be used to create an imager with a wide field-of-view. Additional details of the wide field-of-view of the imagers 120, 122 are provided below with particular reference to FIGS. 3-5.

With reference to FIG. 2, the platter imager 120 is positioned within the lower housing base section 110 and underneath the scan window 116 on the platter 112. In this arrangement, the platter imager 120 directs its field-of-view through the scan window 116 and rearwardly toward the bonnet 114. The platter imager 120 is preferably positioned directly underneath a rear portion of the scan window 116 and tilted upward such that its entire field-of-view is projected through the scan window 116 without being impeded by the platter 112, the lower housing base section 110, or other components of the data reading system 100, including mirrors, prisms, or other optics devices as further described below with reference to FIGS. 3-5. For example, in one embodiment, the platter imager 120 is arranged such that it is flush with the rear edge 126 of the scan window 116. In other embodiments, the platter imager 120 may also be arranged within a range of 30 mm forward or 30 mm rearward of the rear edge 126 of the scan window 116. In addition, the platter imager 120 may be positioned at a depth of between 5 mm and 30 mm underneath the scan window 116. In should be understood that in other embodiments, the precise positioning of the platter imager 120 relative to scan window 116 may depend on the specifications of the platter imager 120, such as focal length and field-of-view. Additional details regarding the field-of-view and other characteristics of the platter imager 120 are provided with particular reference to FIGS. 3-5.

Returning to FIG. 2, the bonnet 114 houses a bonnet imager 122 therein, the bonnet imager 122 positioned behind the scan window 118. In this arrangement, the bonnet imager 122 directs its field-of-view through the scan window 118 and over the platter 112. The bonnet imager 122 is preferably positioned directly behind a top portion of the scan window 118 and tilted downward such that its entire field-of-view is projected through the scan window 118 without being impeded by the bonnet 114 or other components of the data reading system 100, including mirrors, prisms, or other optics devices as further described below with reference to FIGS. 3-5. For example, in one embodiment, the bonnet imager 122 is offset from a top edge 128 of the scan window 118 by up to 5 mm. In other embodiments, the bonnet imager 122 may be placed within a range of 30 mm above or 30 mm below the top edge 128 of the scan window 118. In addition, the bonnet imager 122 may be positioned at a depth behind the scan window 118 within a range between 5 mm and 30 mm. As noted previously with reference to the platter imager 120, in still other embodiments, the precise positioning of the bonnet imager 122 relative to scan window 118 may depend on the specifications of the bonnet imager 122, such as focal length and field-of-view. Additional details regarding the field-of-view and other characteristics of the bonnet imager 122 are provided with particular reference to FIGS. 3-5.

Figure 3:
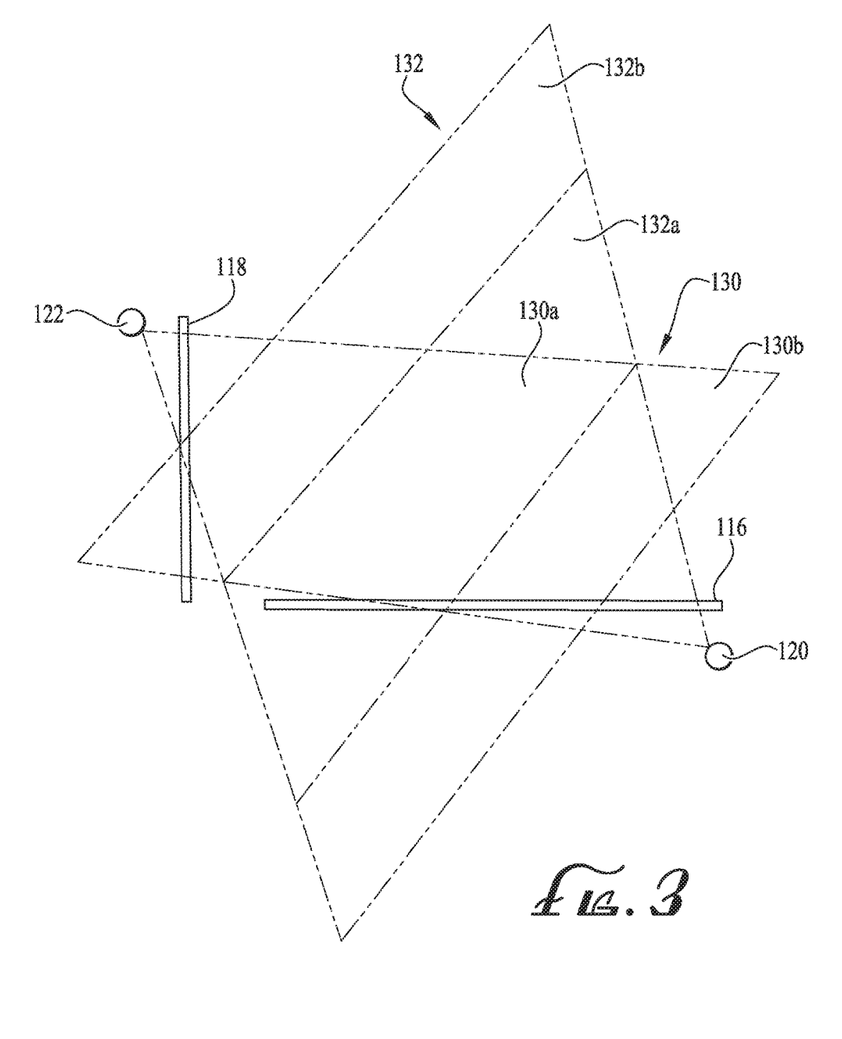
FIG. 3 is a schematic view illustrating a collective field-of-view of the imagers of the data reader of FIG. 1.

FIG. 3 is a schematic view illustrating collective fields-of-view of the imagers 120, 122 in accordance with one embodiment. With reference to FIG. 3, the bonnet imager 122 has a wide-angle field-of-view 130 that projects through the scan window 118 toward the platter 112. As illustrated in FIG. 3, the field-of-view 130 of the bonnet imager 122 may include a smaller reading zone 130a for 10 mil labels and a larger reading zone 130b for 13 mil labels. In some embodiments, the field-of-view 130 of the bonnet imager 122 covers or encapsulates at least the surface of the scan window 116. In other embodiments, the bonnet imager 122 may have a field-of-view 130 that covers at least a portion of the platter 112 extending from the mid-region to the rear end 138. In still other embodiments, the field-of-view 130 covers the entire surface of the platter 112.

Similarly, the platter imager 120 has a wide-angle field-of-view 132 that projects through the scan window 116 toward the bonnet 114. As illustrated in FIG. 3, the field-of-view 132 of the platter imager 120 may include a smaller reading zone 132a for 10 mil labels and a larger reading zone 132b for 13 mil labels. In some embodiments, as further described with reference to FIG. 4 below, the field-of-view 132 of the platter imager 120 covers or encapsulates at least the entire surface of the scan window 118 of the bonnet 114, and may cover the entirety of the bonnet 114 in other embodiments. In this arrangement, the respective fields of view 132, 130 of the imagers 120, 122 collectively provide a sufficiently large reading zone for the data reading system 100 to facilitate the checkout process. It is noted that the fields-of-view shown in the figures are for illustrative purposes, and are not intended to represent either the near field or far field extent of the view volumes.

Figure 4:
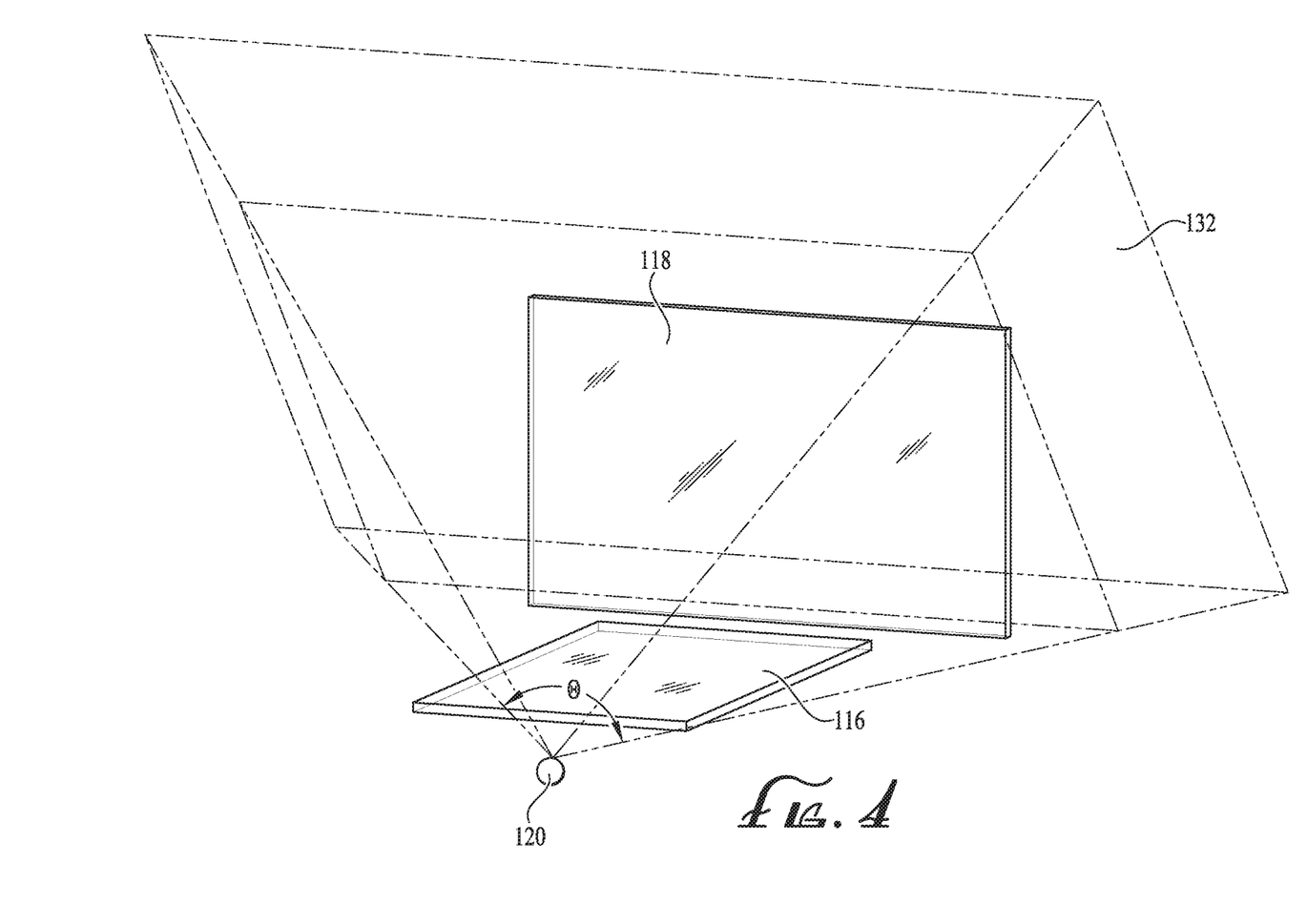
FIG. 4 is a schematic view illustrating a wide-angle field-of-view of one of the imagers of the data reader of FIG. 1.
Figure 5:
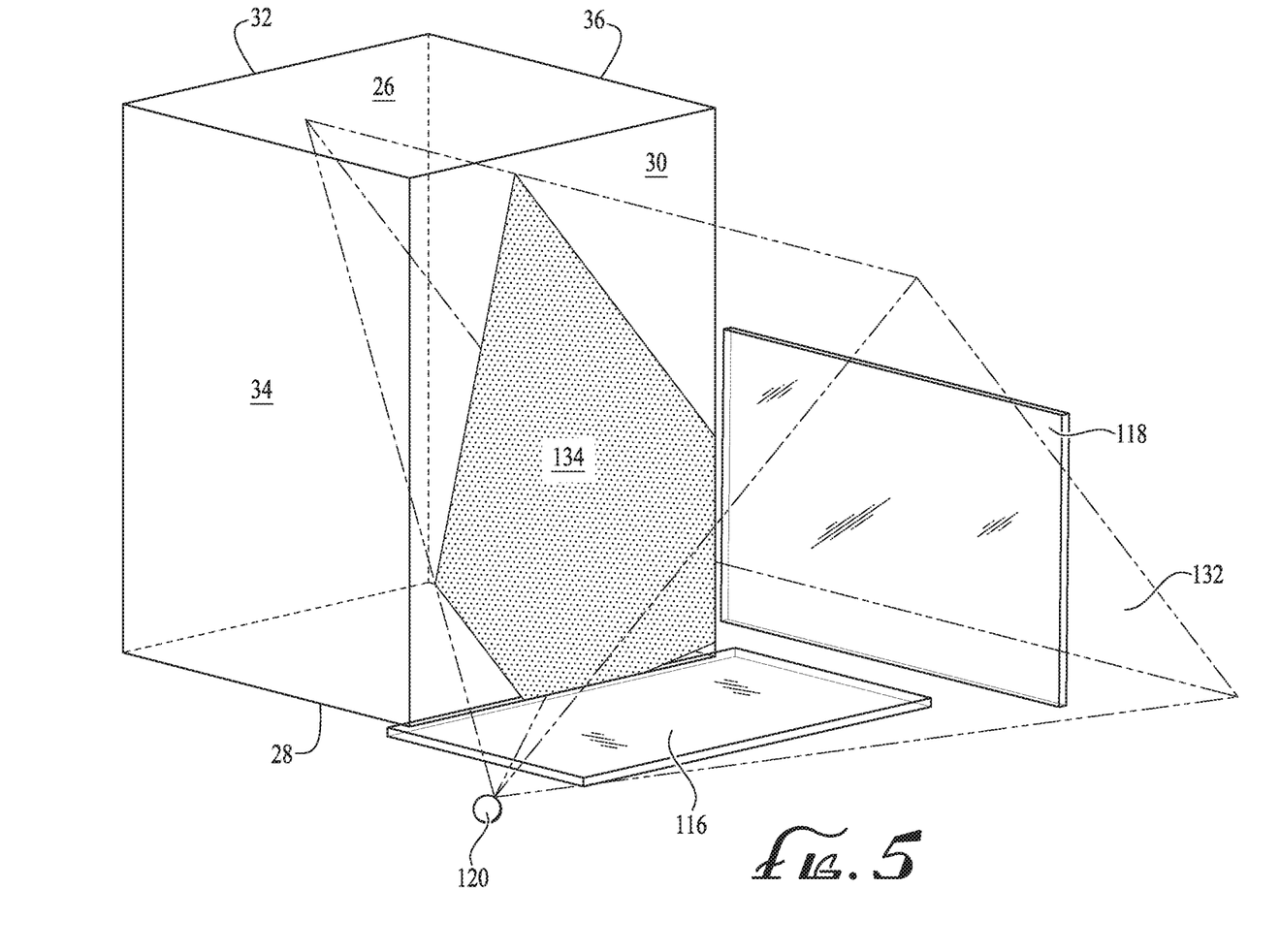
FIG. 5 is a schematic view illustrating an example six-sided box-shaped object captured by the imager of FIG. 4 as it passes through the read region.

Preferably, the data reading system 100 is a mirrorless design where the imagers 120, 122 each project their fields-of-view 132, 130 directly through the respective scan windows 116, 118 without having the fields-of-view 132, 130 segmented or otherwise redirected by interior mirrors in the path to the imagers 120, 122. In other words, there are no mirrors or other optical components positioned between the imagers 120, 122 and the scan windows 116, 118, thereby allowing the fields-of-view 132, 130 of the imagers 120, 122 to be non-segmented and non-redirected or otherwise impeded as they project into the read region of the data reading system 100. With reference to FIGS. 4 and 5, the following provides additional details relating to the functional operation of a mirrorless configuration for the data reading system 100.

FIG. 4 is a schematic view illustrating an example field-of-view 132 of the platter imager 120. While the following focuses on the features and characteristics of the platter imager 120, it should be understood that the same features and characteristics may apply equally to the bonnet imager 122. To avoid repetition, specific features of the bonnet imager 122 may not be further discussed herein. With reference to FIG. 4, the platter imager 120 (and the bonnet imager 122) has a wide-angle field-of-view that accommodates a large read region for the data reading system 100 without requiring the use of mirrors or other optics to supplement or expand the field-of-view of the imagers.

As illustrated in FIG. 4, the field-of-view 132 of the platter imager 120 may range at an angle θ between 70° to 120° (measured for the long dimension of the imager as shown in FIG. 4) to ensure that most, if not all, of the field-of-view 130 is directed through the scan window 116 without being impeded by other components of the data reading system 100, such as the platter 112. As illustrated in FIG. 4, the wide angle of the platter imager 120 provides a wide coverage range for the field-of-view 132, where the field-of-view 132 covers the entirety of the scan window 118 of the bonnet 114 as noted previously.

In many embodiments, the precise angle of the field-of-view for the imagers may vary depending on features of the imagers (e.g., focal length) or the positioning of the imagers relative to the scan windows. For example, in some embodiments, the angle θ may be on the smaller side of the above-referenced range (e.g., 70° to 85°) in embodiments where the imagers are placed further away from the scan windows. Alternatively, the angle θ may be on the larger side of the above-referenced range (e.g., 85° to 120°) in embodiments where the imagers are placed closer to the scan windows.

FIG. 5 illustrates a schematic view of an example reading operation in accordance with one embodiment. With reference to FIG. 5, as the object 20 approaches the field-of-view 132 of the platter imager 120, the leading side 30 first intersects the field-of-view 132, as illustrated by the region 134. As the object 20 continues moving over the platter 112 and horizontally across the scan window 116, the platter imager 120 captures the bottom side 28, the customer side 34, and the trailing side 32 of the object 20. Accordingly, the single platter imager 120 is able to capture one more images including four sides of the object 20 as it passes through the read region of the data reading system 100. Similarly, the bonnet imager 122 (not shown in FIG. 5) is able to capture one or more images including the leading side 30, the bonnet side 36, and the trailing side 32, as well as the top side 26 for items that are not taller than the bonnet 114. Accordingly, the bonnet imager 122 is also capable of capturing views including all four sides of the object 20. Collectively, therefore, the imagers 120, 122 are arranged to capture images from all sides of the object 20 without requiring mirrors to supplement or expand the field-of-view of the imagers either by segmenting or otherwise redirecting the field-of-view. As illustrated, there are several regions of overlap between the imagers 120, 122, which serves to enhance the ease of scanning with the data reading system 100.

Depending on the layout of the data reading system 100, and the environment of the store/checkout stand arrangement, ambient lighting may be sufficient to provide adequate illumination for the imagers 120, 122, especially where the imagers 120, 122 are designed with a wide aperture. Since most shoppers or customers in a self-checkout process tend to be slower as compared to clerks, issues with potential motion blur of the data reading system 100 are diminished. In some embodiments, however, additional light sources may be added. For example, illumination may be used as a guide for aiding customers in completing the checkout process. This illumination may also serve to supplement the ambient light and provide sufficient light for the imagers 120, 122.

Although the description above contains much specificity, these details should not be construed as limiting the scope of the invention, but as merely providing illustrations of some embodiments of the disclosed subject matter. It is intended that subject matter disclosed in any portion herein can be combined with the subject matter of one or more of other portions herein as long as such combinations are not mutually exclusive or inoperable.

The terms and descriptions used above are set forth by way of illustration only and are not meant as limitations. Thus, while certain embodiments and example applications have been shown and described, it will be apparent to those having skill in the art that many changes may be made to the details of the above-described embodiments without departing from the underlying principles of the invention. The scope of the invention should, therefore, be determined only by the following claims.

The invention claimed is:

1. A data reading system for reading encoded data on an item, the data reading system comprising:
 a platter supported by a lower base section, the platter having a first end, an opposite second end, and a mid-region positioned between the first and second ends, the mid-region having a first scan window arranged thereon;

a bonnet arranged adjacent the first end of the platter, the bonnet extending upwardly from the platter and including a front face oriented toward the second end of the platter, the front face including a second scan window arranged thereon;

a single first imager housed in the lower base section adjacent the first scan window on the platter, the single first imager having a non-segmented and non-redirected first field-of-view directed upwardly through the first scan window and toward the bonnet, wherein the first field-of-view of the single first imager encapsulates at least the second scan window on the bonnet, the single first imager operable to capture a first image of the item as the item passes across the first scan window; and a single second imager housed in the bonnet adjacent the second scan window, the single second imager having a non-segmented and non-redirected second field-of-view directed through the second scan window and toward the platter, wherein the second field-of-view of the single second imager encapsulates at least the first scan window on the platter, the single second imager operable to capture a second image of the item as the item passes across the second scan window, wherein the first and second fields of view are each wide-angle fields-of-view, wherein the first and second fields-of-view are arranged at an angle ranging between 70° and 120 °.

2. The data reading system of claim 1, wherein the second field-of-view of the second imager further encapsulates the mid-region and the first end of the platter.

3. The data reading system of claim 1, wherein the first field-of-view of the first imager is configured to capture the first image including at least a first side, a second side, a third side, and a fourth side of the item within the first field-of-view when the item passes across the first scan window.

4. The data reading system of claim 1, wherein the second field-of-view of the second imager is configured to capture the second image including at least a first side, a second side, a third side, and a fourth side of the item within the second field-of-view when the item passes across the second scan window.

5. The data reading system of claim 1, wherein the first field-of-view of the first imager is configured to capture the first image including at least a first side, a second side, a third side, and a fourth side of the item within the first field-of-view when the item passes across the first scan window, and wherein the second field-of-view of the second imager is configured to capture the second image including at least the first side, the second side, a fifth side, and a sixth side of the item within the second field-of-view when the item passes across the second scan window.

6. The data reading system of claim 1, wherein the first imager is offset from a rear edge of the first scan window within a range of up to 30 mm forward of the rear edge and up to 30 mm rearward of the rear edge, and wherein the first imager is positioned at a depth underneath the first scan window within a range between 5 mm and 30 mm.

7. The data reading system of claim 1, wherein the second imager is offset from a top edge of the second scan window within a range of up to 30 mm above the top edge and up to 30 mm below the top edge, and wherein the second imager is positioned at a depth behind the second scan window within a range between 5 mm and 30 mm.

8. The data reading system of claim 1, wherein the first single imager and the second single imager each have an aspect ratio arranged in a panoramic configuration with a width-to-height ratio greater than 120%.

9. The data reading system of claim 1, wherein the angles of the first and second fields-of-view range between 70° and 85°.

10. The data reading system of claim 1, wherein the angles of the first and second fields-of-view range between 85° and 120°.

11. The data reading system of claim 1, wherein the single first imager is positioned underneath a rear portion of the first scan window such that the single first imager is tilted upward toward the second scan window in the bonnet.

12. The data reading system of claim 11, wherein the single second imager is positioned behind a top portion of the second scan window in the bonnet such that the single second imager is tilted downward toward the first scan window on the platter.

13. The data reading system of claim 1, further comprising a self-checkout station incorporating the platter and the bonnet.

14. A method for reading encoded data on an item, the method comprising:
providing a data reader comprising:
a platter supported by a lower base section, the platter having a first end, an opposite second end, and a mid-region positioned between the first and second ends, the mid-region having a first scan window arranged thereon;
a bonnet arranged adjacent the first end of the platter, the bonnet extending upwardly from the platter and including a front face oriented toward the second end of the platter, the front face including a second scan window arranged thereon;
single first imager housed in the lower base section adjacent the first scan window on the platter, the single first imager having a non-segmented and non-redirected first field-of-view directed upwardly through the first scan window and toward the bonnet, wherein the first field-of-view of the single first imager encapsulates at least the second scan window on the bonnet, the single first imager operable to capture a first image of the item as the item passes across the first scan window; and
a single second imager housed in the bonnet adjacent the second scan window, the single second imager having a non-segmented and non-redirected second field-of-view directed through the second scan window and toward the platter, wherein the second field-of-view of the second imager encapsulates at least the first scan window on the platter, the single second imager operable to capture a second image of the item as the item passes across the second scan window, and wherein the first and second fields of view are each wide-angle fields-of-view, and wherein the first and second fields-of-view are arranged at an angle ranging between 70° and 120°;
capturing, via the single first imager, a first image of the item as the item passes across the first scan window;
capturing, via the single second imager, a second image of the item as the item passes across the second scan window; and
processing the first and second images of the item to decode the encoded data.

15. The method of claim 14, wherein the second field-of-view of the second imager further encapsulates the mid-region and first end of the platter.

16. The method of claim 14, wherein the first image includes at least a first side, a second side, a third side, and a fourth side of an item within the first field-of-view when the item passes across the first scan window.

17. The method of claim 14, wherein the second image includes at least a first side, a second side, a third side, and a fourth side of an item within the first field-of-view when the item passes across the second scan window.

18. The method of claim 14, wherein the first image includes at least a first side, a second side, a third side, and a fourth side of an item within the first field-of-view when the item passes across the first scan window, and wherein the second image includes at least the first side, the second side, a fifth side, and a sixth side of the item within the second field-of-view when the item passes across the second scan window.

19. The method of claim 14, wherein the first imager is offset from a rear edge of the first scan window within a range of up to 30 mm forward of the rear edge and up to 30 mm rearward of the rear edge, and wherein the first imager is positioned at a depth underneath the first scan window within a range between 5 mm and 30 mm.

20. The method of claim 14, wherein the second imager is offset from a top edge of the second scan window within a range of up to 30 mm above the top edge and up to 30 mm below the top edge, and wherein the second imager is positioned at a depth behind the second scan window within a range between 5 mm and 30 mm.

\* \* \* \* \*